United States Patent [19]
Thettu

[11] 3,934,477
[45] Jan. 27, 1976

[54] TEMPERATURE SENSING DEVICE

[75] Inventor: Raghulinga R. Thettu, Webster, N.Y.

[73] Assignee: Xerox Corporation, Stamford, Conn.

[22] Filed: Nov. 13, 1974

[21] Appl. No.: 523,615

Related U.S. Application Data

[62] Division of Ser. No. 388,676, Aug. 15, 1973, Pat. No. 3,888,622.

[52] U.S. Cl. .................. 73/362.8; 73/351
[51] Int. Cl.$^2$. G01K 1/16; G01K 7/16; G01K 13/08
[58] Field of Search ............. 73/351, 362.8

[56] References Cited
UNITED STATES PATENTS

| | | | |
|---|---|---|---|
| 2,279,846 | 4/1942 | Stapleton | 73/351 UX |
| 3,357,249 | 12/1967 | Bernous et al. | 73/351 |
| 3,533,288 | 10/1970 | Franck | 73/343 R |
| 3,690,176 | 12/1972 | Connolly et al. | 73/351 |

Primary Examiner—Richard C. Queisser
Assistant Examiner—Frederick Shoon

[57] ABSTRACT

A conductive heat transfer mechanism through which energy readily flows between two bodies or systems at different temperatures. The present mechanism is embodied in a temperature sensing network for determining and controlling the surface temperature of a xerographic fuser roll. The network includes a probe shoe containing at least one temperature sensing element with the shoe being positioned in close non-contiguous relation with the moving surface of a heated fuser roll. A magnetic flux field is created within the air gap between the heated roll surface and the probe shoe and a magnetic medium, preferably being in fluid form, having a relatively high coefficient of thermal conductivity is placed within the flux field through which a rapid and efficient flow of heat is maintained.

5 Claims, 4 Drawing Figures

TEMPERATURE SENSING DEVICE

This is a division, of application Ser. No. 388,676, filed Aug. 15, 1973, now U.S. Pat. No. 3,888,622.

This invention relates generally to a heat transfer device and, in particular, to apparatus for sensing the surface temperature of a fuser roll as conventionally utilized in the xerographic copying art.

Heretofore, most heat transfer systems for determining the temperature of a given body have been of the contact type wherein the sensing element is placed in direct physical contact with the body under investigation. In order to get a truly responsive sampling of the surface temperature, the probe should preferably encompass as much of the heated surface area as is practically possible. Maintaining the positive contact required for uniform and efficient heat flow between the two contacting surfaces over a large area has been difficult to accomplish particularly in the case where the heated surface is rough, irregular or arcuate in shape. When the heated surface under investigation is moving, as for example, as in the case of a moving heated pressure roll surface as conventionally utilized in the xerographic process, a good deal of surface resistance is also developed between the surface which leads to erroneous temperature information being transmitted therebetween. Similarly, a dissimilar temperature reading is normally generated for the same body temperature when the heated body is held in a stationary condition than when it is moving. Likewise, any contaminants such as dirt, toner, lint or the like coming between the contacting probe surface and that of the body under investigation further aggravates all of the problems herein alluded to. In short, it has heretofore been extremely difficult, if not impossible, to maintain an accurate flow of thermal information between two contacting surfaces.

It is therefore an object of the present invention to provide a media through which heat energy can be rapidly and efficiently transferred between two bodies regardless of the shape of the body or whether or not one of the bodies is in motion.

A further object of the present invention is to improve heat pressure roll image fixing systems.

Another object of the present invention is to provide a reliable mechanism for sensing the surface temperature of a heated pressure roll.

A still further object of the present invention is to control the input energy provided to a heated pressure roll in order to produce a uniform surface temperature at the roll surface under varied operating conditions.

Another object of the present invention is to reduce the contact resistance generated between a temperature sensing probe and a heated pressure roll surface.

These and other objects of the present invention are attained by means of a temperature sensing device arranged to provide information to a fuser control network, the sensor including a sensing probe shoe for supporting a sensing element and being positioned in close non-contiguous proximity with the surface of a heated pressure roll. A magnet is positioned adjacent to the probe shoe, preferably behind the probe surface, which is capable of establishing a flux field directed at the roll surface. A magnetic fluid having a low surface energy is introduced into the magnetic flux field to provide a thermal circuit between the roll surface and the sensing probe element which exhibits a low contact resistance in regard to the fuser roll surface through which energy is conductively transferred from the roll to the sensor.

For a better understanding of the invention as well as other objects and further features thereof reference is had to the following detailed description of the present invention to be read in connection with the accompanying drawings, wherein.

Figure 1:
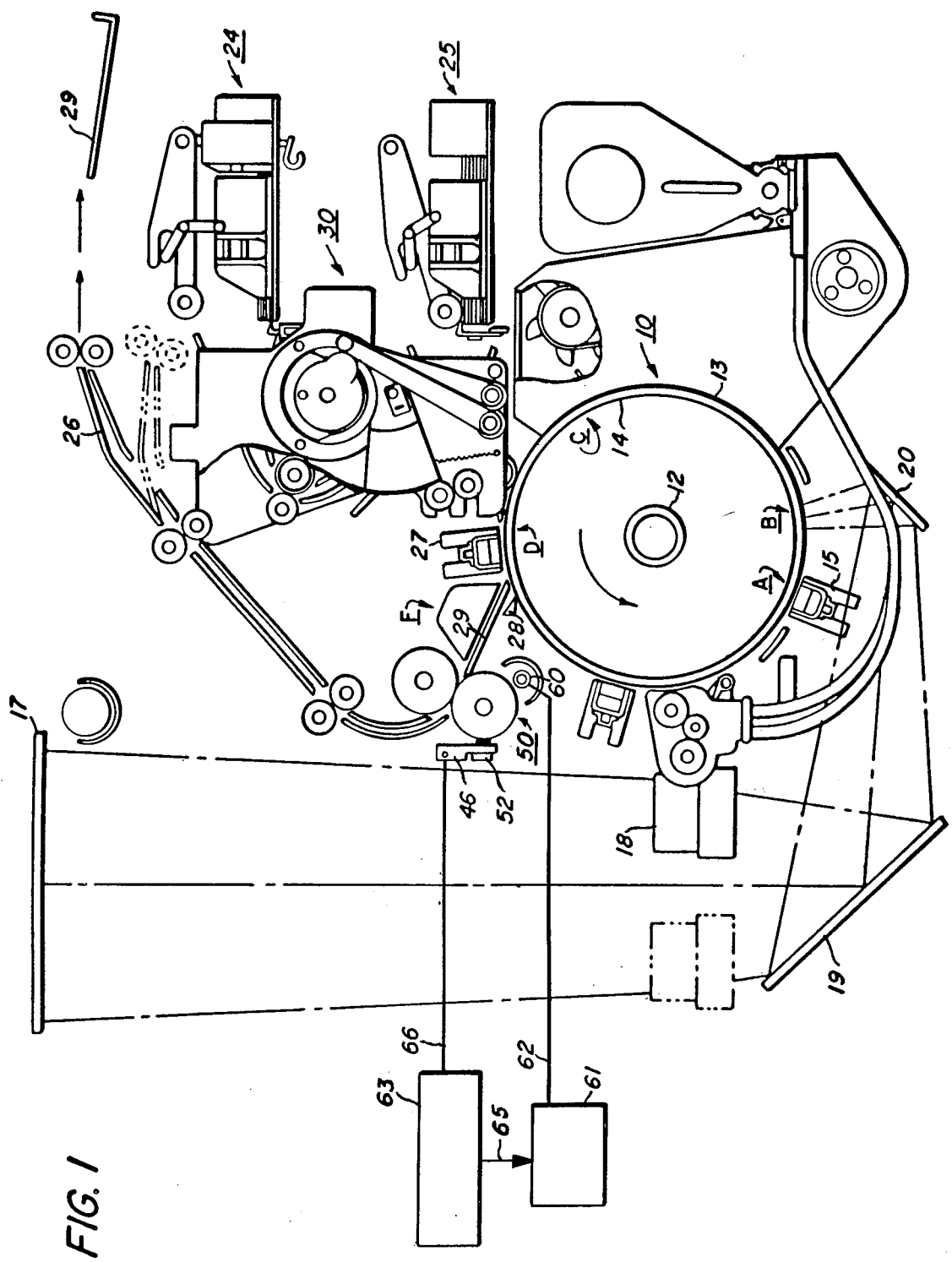
FIG. 1 is a schematic elevation of an automatic xerographic copying machine utilizing the teachings of the present invention.

Referring now to FIG. 1, there is illustrated a schematic representation of an automatic xerographic reproducing machine employing the temperature sensing device of the present invention. It should be noted that the apparatus of the present invention will be explained in conjunction with the reusable xerographic process. However, it should be clear to one skilled in the art that the apparatus of the present invention is not so limited and that the invention has wider application in any environment where it is desirous or necessary to accurately ascertain the surface temperature of a heated body.

Because the xerographic copying process is well known and used in the art, the processing steps herein employed will only be briefly described in reference to FIG. 1. Basically, the heart of the machine involves a photosensitive plate 10 which is formed in a drum configuration. The drum is mounted upon a horizontally aligned support shaft 12 and caused to rotate in the direction indicated so that the photosensitive plate passes sequentially through a series of processing stations. The drum shaped plate basically consists of an outer layer 13 of photoconductive material, such as selenium or the like that is placed over a grounded substrate 14.

In operation, the plate is initially charged to a uniform potential at a charging station A by means of a corona generator 15. The uniformly charged plate surface is then moved into an imaging station B wherein a flowing light image of the original document, which is supported upon a viewing platen 17 is projected onto the photoconductive plate surface by means of a moving scanning lens element 18 and a pair of mirrors 19 and 20. As a result of the imaging process a latent electrostatic image containing the original subject matter is recorded on the photoconductive plate surface.

The latent image is next transported on the drum through a developing station C wherein the latent image is rendered visible by the application of specially prepared charge toner particles which are cascaded over the image plate surface. The now visible toner image is then transported into the next subsequent processing station, an image transfer station D, wherein a sheet of final support material is fed from either one of two supply tray areas, an upper supply tray 24 and a lower supply tray 25, via sheet registering and forwarding mechanism 30 in synchronous moving contact with the visible image carried on the plate surface. The support sheet and the charged toner image on the drum surface are moved together under a transfer corona generator 27 which serves to electrostatically transfer the toner images in image configuration from the drum surface onto the contacting side of the support sheet. The imaged sheet is then stripped from the drum surface by means of a pick off finger 28 and directed along a stationary vacuum transport 29 into the nip of a heat pressure roll system F. For further details concerning this type of fusing device, reference is had to U.S. Pat. No. 3,498,596 which issued in the name of Moser.

As noted above, the automatic copying device has the capability of producing either single sided copy, that is copy bearing a toner image on one side thereof or double sided copy. In a single sided mode of operation, the final support sheets are fed from either one of the two supply trays directly into the image transfer station via the sheet forwarding and registering mechanism 30. Upon the accomplishment of the transfer step, the image sheet is passed through the fuser roll assembly and forwarded directly into a copying tray 29 where the copies are stored and held until such time as the machine operator removes them. On the other hand, when a two sided copying mode of operation is selected, movable transport 26 within the circular paper path, is lowered to the dotted line position as shown in FIG. 1 and the upper supply tray, which has previously been emptied of all support material is automatically prepared to accept a copy sheet directed therein. The copy sheets are then fed from the lower support tray to the image transfer station and the image fusing station directly into the upper support tray area where the sheets are stored until the machine is further programmed for a second run. Upon the initialization of the second copy run, the movable transport 26 is once again raised to solid line position as shown in FIG. 1 and the once imaged copy sheets are fed again directly from the upper supply tray through the transfer and fusing stations wherein a second image is created on the opposite or previously non-image side of the sheet. After fusing, the two sided copy sheets are fed directly into a copy tray in the manner herein described above.

Figure 2:
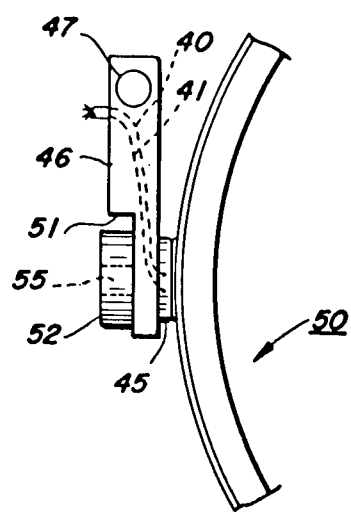
FIG. 2 is an enlarged sectional view illustrating a pressure roll heat fixing system utilized in the automatic copying machine shown in FIG. 1 showing the sensing probe mounted in close proximity to the fuser roll surface.
Figure 3:
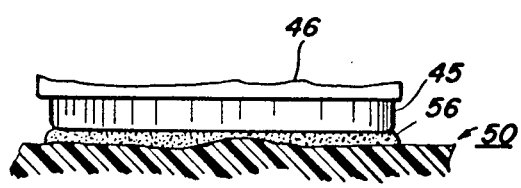
FIG. 3 is an enlarged partial view of the probe shoe of the sensing element illustrating the conforming characteristics of the magnetic fluid positioned between the shoe and the fuser roll surface.
Figure 4:
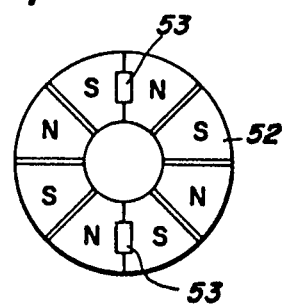
FIG. 4 is a diagramatic illustration of one embodiment of the magnetic arrangement utilized in the present invention.

Referring now more specifically to FIGS. 2–4 there is shown a preferred embodiment of the subject invention in a suitable environment such as that disclosed in the above noted patent to Moser. The preferred embodiment of the present invention includes two temperature responsive resistance elements 40 and 41 which can be of any commercially available type such as those supplied by Victor Engineering of Springfield, New Jersey. However, it should be clear that the invention is not limited to this specific type or number of sensing elements and any suitable sensor capable of producing either an ampere change or voltage change in response to a change in temperature sensed can be utilized herein without departing from the teachings of the present invention.

The temperature sensing elements are secured within a non-permeable circular probe shoe 45 mounted in the free end of a support arm 46 which is similarly constructed of a non-permeable material such as aluminum, plastic or the like. The support arm, in turn, is secured to the main machine frame (not shown) by means of a locating pin 47 so as to position the probe shoe adjacent to but in non-contiguous relation with the outer surface of the heated pressure fuser roll 50. A cut out 51 is provided in the back side of the support arm, that is, the side of the arm opposed to the fuser roll, to receive an annular magnet 52. As shown in FIG. 4, the magnet is preferably circular in shape, being approximate in shape with the probe shoe and having a clear aperture 53 running through the center thereof. The magnet is divided into two discrete halves along its vertical center line and is provided with two detent snaps 53 by which the two halves of the magnet can be conveniently joined together. Each half of the magnet is made up of a series of north and south pole pieces with opposite pole pieces being located adjacent to each other in the manner illustrated so that a relatively strong and continuous flux field is established about the magnetic structure.

In assembly, the two magnet segments are snapped together over a support shaft 55 extending outwardly from the lower portion of the support arm. The strong magnetic force field is thus passed through the non-permeable support arm and probe shoe into the air gap region between the probe shoe and the fuser roll surface. A magnetic medium 56, having a relatively high coefficient of thermal conductivity, is placed in the magnetic flux field within the air gap region. Preferably a magnetic fluid consisting of a fluidic silicone based oil containing ferrite or permeable particles which are coated with a non-coagulating material to prevent the particles from forming clusters within the fluid is herein employed. Such magnetic fluids are commercially available through the Ferro Fluidics Corp. of Bulington, Mass. It should be cleaar to one skilled in the art that the magnetic medium need not necessarily be in a truly fluidic form and the medium can be established in the manner herein disclosed by using permeable particles, such as ferrite or the like, which are coated with a low surface energy material such as silicone.

As can be seen in FIG. 3, the magnetic fluid is held within the flux field created in the air gap region and thus provides a floating interface between the probe shoe and the fuser roll surface which exhibits both an extremely low thermal contact resistance and low frictional characteristics to the roll surface while at the same time is capable of delivering an extremely efficient and fast thermal response to the sensing probe. It should also be further noted that the floating interface, because of its fluid-like characteristics, also provides a self-compensating structure capable of accommodating any changes in the air gap size caused by fuser roll run-out or other imperfections or irregularities found on the roll surface. Similarly, the free floating heat transfer medium insures a positive, highly efficient, flow of energy between the two bodies regardless of the shape or roughness of the bodies or the area of the flow zone involved. Furthermore, by selecting a magnetic fluid having a low surface energy, the probe is also provided with an inherent self-cleaning feature. Any foreign matter or toner material accumulated on the roll surface will thus pass through the magnetic fluid without being entrapped in the fluid thereby keeping the probe relatively clean under normal operating conditions. Since the probe and the fuser roll surface are maintained at the same temperature, there is no viscosity gradient presented to the foreign matter carried on the roll surface which would tend to draw this foreign matter to the probe shoe surface.

As illustrated in FIG. 1, the power input to the fusing system is provided by means of an elongated radient heat lamp 60 mounted in close proximity to the lower fuser roll surface 50 just downstream from the point where the roll surface enters the fuser nip. Power to the radient lamp is supplied by means of a variable power supply 61 via line 62. In practice, the sensing elements 40 and 41 mounted within the probe are arranged to send a voltage signal via line 66 to a comparator network 63, the amplitude of which varies as the surface temperature of the roll varies. It should be clear, however, that a current sensing network can be used equally as well in the present system without departing from the teachings of the present invention. The comparator network basically consists of a voltage comparator circuit which is arranged to compare the voltage information received from the probe to a predetermined reference voltage. When the compared voltage moves to either side of the reference voltage, a signal is sent via line 65 to the variable power supply of the fuser system which, in response thereto, charges the power output so as to hold the fuser roll surface temperature within a predetermined operating range.

While this invention has been described with reference to the structure herein disclosed, it is not confined to the details as set forth, and this application is intended to cover any modifications or changes as may come within the scope of the following claims.

What is claimed is:

1. Apparatus for sensing the surface temperature of a heated body including
   a temperature sensing element mounted within a probe,
   means to support the probe adjacent to the heated body in non-contiguous relation therewith so as to form an air gap therebetween,
   magnetic means for establishing a flux field within the air gap between the probe and the heated body, and
   a magnetic medium filling the air gap and having a relatively high coefficient of thermal conductivity and being supported within the magnetic flux field to effect low frictional characteristics while providing rapid thermal response.

2. The apparatus of claim 1 wherein said magnetic medium has a lower surface energy than the heated body whereby contaminants on the heated body are not attracted to the probe.

3. Apparatus for sensing the surface temperature of a heated body including
   a temperature sensing element mounted within a probe,
   means to support the probe adjacent to the heated body in non-contiguous relation therewith so as to form an air gap therebetween,
   magnetic means for establishing a flux field within the air gap between the probe and the heated body, and
   a magnetic medium having a relatively high coefficient of thermal conductivity supported within the magnetic flux field,
   wherein said probe is constructed of a non-permeable material and the magnetic means is arranged to direct a flux field through said probe into the air gap.

4. The apparatus of claim 1 wherein said magnetic medium is a liquid.

5. The apparatus of claim 1 wherein said magnetic medium includes magnetic particles.

* * * * *